US008782349B2

(12) United States Patent
Langendorf et al.

(10) Patent No.: US 8,782,349 B2
(45) Date of Patent: *Jul. 15, 2014

(54) SYSTEM AND METHOD FOR MAINTAINING CACHE COHERENCY ACROSS A SERIAL INTERFACE BUS USING A SNOOP REQUEST AND COMPLETE MESSAGE

(75) Inventors: Brian Keith Langendorf, Benicia, CA (US); David B. Glasco, Austin, TX (US); Michael Brian Cox, Menlo Park, CA (US); Jonah M. Alben, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,980

(22) Filed: Jul. 25, 2012

(65) Prior Publication Data
US 2012/0290796 A1 Nov. 15, 2012

Related U.S. Application Data

(63) Continuation of application No. 12/331,302, filed on Dec. 9, 2008, now Pat. No. 8,234,458.

(51) Int. Cl.
*G06F 12/00* (2006.01)
*G06F 12/08* (2006.01)

(52) U.S. Cl.
USPC .......................................... 711/146; 711/141

(58) Field of Classification Search
USPC .................................. 711/141, 146
See application file for complete search history.

(56) References Cited

U.S. PATENT DOCUMENTS

| 6,088,770 | A  | * | 7/2000 | Tarui et al. ..................... 711/148 |
| 6,292,872 | B1 | * | 9/2001 | Arimilli et al. ............... 711/146 |
| 7,543,115 | B1 | * | 6/2009 | Batson et al. .................. 711/141 |
| 7,644,237 | B1 | * | 1/2010 | Petersen et al. ............... 711/146 |

(Continued)

FOREIGN PATENT DOCUMENTS

| KR | 10-1999-0072293 | * | 9/1999 |
| KR | 10-2007-0059127 | * | 6/2007 |
| WO | 2006/044743 | * | 4/2006 |

OTHER PUBLICATIONS

KIPO Office Action, KR Appl. No. 10-2009-121685, mailed Mar. 10, 2011. (See summary from p. 1-3 of enclosure from Kim & Chang.).*

(Continued)

*Primary Examiner* — Sanjiv Shah
*Assistant Examiner* — Glenn Gossage
(74) *Attorney, Agent, or Firm* — Patterson & Sheridan, LLP

(57) ABSTRACT

Techniques are disclosed for maintaining cache coherency across a serial interface bus such as a Peripheral Component Interconnect Express (PCIe) bus. The techniques include generating a snoop request (SNP) to determine whether first data stored in a local memory is coherent relative to second data stored in a data cache, the snoop request including destination information that identifies the data cache on the serial interface bus and causing the snoop request to be transmitted over the serial interface bus to a second processor. The techniques further include extracting a cache line address from the snoop request, determining whether the second data is coherent, generating a complete message (CPL) indicating that the first data is coherent with the second data, and causing the complete message to be transmitted over the bus to the first processor. The snoop request and complete messages may be vendor defined messages.

20 Claims, 7 Drawing Sheets

(56) References Cited

U.S. PATENT DOCUMENTS

| 7,698,509 | B1* | 4/2010 | Koster et al. | 711/146 |
| 2002/0053004 | A1* | 5/2002 | Pong | 711/119 |
| 2008/0162661 | A1* | 7/2008 | Mannava et al. | 709/213 |
| 2010/0082866 | A1* | 4/2010 | White et al. | 710/260 |

OTHER PUBLICATIONS

English language abstract of JP9223115, Aug. 26, 1997, Shimoyama et al.*

English language abstract of JP10240707, Sep. 11, 1998, Tarui et al.*

"PCI Express System Architecture," Mindshare, Inc. (Ravi Budruk et al), Published by Addison-Wesley Professional, Sep. 4, 2003, pp. 35-49, 78-82 and 109-115.*

* cited by examiner

SYSTEM AND METHOD FOR MAINTAINING CACHE COHERENCY ACROSS A SERIAL INTERFACE BUS USING A SNOOP REQUEST AND COMPLETE MESSAGE

CROSS-REFERENCE TO RELATED APPLICATIONS

This application is a continuation of U.S. patent application entitled "SYSTEM AND METHOD FOR MAINTAINING CACHE COHERENCY ACROSS A SERIAL INTERFACE BUS USING A SNOOP REQUEST AND COMPLETE MESSAGE," Ser. No. 12/331,302, filed Dec. 9, 2008, hereby incorporated herein by reference, now U.S. Pat. No. 8,234,458.

BACKGROUND OF THE INVENTION

1. Field of the Invention

The present invention relates generally to the field of distributed computing and more specifically to a system and method for maintaining cache coherency across a serial interface bus, such as Peripheral Component Interconnect Express (PCI Express or PCIe).

2. Description of the Related Art

In conventional computing systems, a processor reads data from an external memory unit and stores a copy of the data in a low-latency cache memory unit (cache) for later use. The processor may then read the copy of the data from the cache instead of reading the data from the external memory unit when executing operations using the data. Since data accesses between the processor and the external memory unit have a higher latency than data accesses between the processor and the cache, retrieving data from the cache allows the processor to execute instructions more quickly, and, ultimately, increases the performance of the processor. Caches are usually implemented as static random-access memory (SRAM) or another type of low-latency memory unit.

A typical cache is organized into a plurality of lines in which data is stored. Each line is marked with a tag that describes the validity of the cached data stored in that line. For example, when a processor copies data from the external memory to a particular cache line, that cache line is marked as "valid," since the cached copy of the data is identical to the original data stored in the external memory unit. Alternatively, when the processor reads data from the cache line, modifies the data, and writes the modified data back to the cache line, then the cache line may be marked as "modified," because the cached copy of the data is modified relative to the original data stored in the external memory unit. The modified data may be written back to the external memory unit so that the data stored in the external memory unit is identical to the cached data. When the data stored in the external memory unit is identical to the corresponding data stored in the cache, the cache is considered to be "coherent." A cache is also coherent if the data differs from that stored in the main memory, as long as the cached data is marked as "modified." Cached data would be "incoherent" if the cache stored different data than that stored in main memory, but the data was not marked as modified or if different caches had the same data marked as modified.

Caches may be implemented in distributed computing systems that include multiple processors interconnected by a PCI Express (PCIe) bus. Each processor may read data from one or more external memory units and store a copy of the data in a cache associated with the processor. The processor may then use the cached copy of the data to perform processing operations. If the processor modifies the cached copy of the data, then the processor may write the modified data back to the external memory unit in order to maintain cache coherency with the external memory unit, as described above. However, multiple central processing units (CPUs) in conventional systems cannot read and cache data across PCIe because there currently does not exist a way to maintain cache coherency across PCIe.

Each processor may also receive data through the PCIe bus. When a processor receives data via the PCIe bus, that data is typically marked as either "uncacheable" (UC) or "write-combining" (WC). Data marked uncacheable cannot be stored in a cache because the state of the computing system may be dependent on this data. In such a case, referencing this data may have effects that are expected by the computing system and required for normal operations. Accordingly, the data must be accessible to the computing system so that modifications to the data are known to the computing system. Thus, this data cannot be stored in an intervening cache without risking unpredictable operation of the computing system. Data marked WC is received into a buffer as data fragments. Those fragments are then combined to reproduce the data. The combined data is then delivered as one large write instead of multiple smaller writes. Data marked WC also cannot be cached because reads to a location marked as WC are treated in the same way as reads to locations marked UC.

One problem with the aforementioned configuration is that when a processor reads data that is marked UC or WC, that data cannot be cached by the processor. For example, if the processor executes multiple processing operations using the same data that was marked UC or WC, then the processor would be required to read the data from an external (non-cache) memory unit multiple times, thus introducing significant latencies. Another problem is that when a processor executes instructions using data that is marked UC, the processor serializes the execution of those instructions, which reduces the efficiency of the processor. Importantly, data that is received over a PCIe bus (e.g., data copied from the cache of another processor in a multiprocessor system) is marked as UC or WC. This data, therefore, cannot be cached, which introduces additional latencies. One solution to this problem is to avoid connecting processors with a PCIe bus. However, this solution greatly limits the possible configurations of the computing system.

Accordingly, there remains a need in the art for an improved caching technique across a bus such as a PCIe bus.

SUMMARY OF THE INVENTION

One embodiment of the invention sets forth a method and system for maintaining cache coherency across a serial interface bus such as a Peripheral Component Interconnect Express (PCIe) bus. The method comprises generating a snoop request configured to determine whether first data stored in a local memory coupled to a first processor is coherent relative to second data stored in a data cache coupled to a second processor, the snoop request including destination information that identifies the data cache on a serial interface bus, and a cache line address identifying where in the data cache the second data is located; causing the snoop request to be transmitted over the serial interface bus to the second processor based on the destination information that identifies the data cache; extracting the cache line address from the snoop request; determining whether the second data stored in the data cache at the cache line address is coherent relative to the first data stored in the local memory; generating a complete (CPL) message that includes destination information that identifies the local memory on the serial interface bus, and completion information indicating that the first data is coherent relative to the second data; causing the CPL message to be transmitted over the serial interface bus to the first processor based on the destination information that identifies the local memory; and causing the processing operation to be executed on the first processor using the first data stored in the local memory.

Advantageously, data transmitted across the PCIe bus may be marked as "cacheable," removing the need for processors that receive this data to serialize the execution of program instructions. Thus, processor speed is improved when performing operations with data received over the PCIe bus relative to prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. The appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
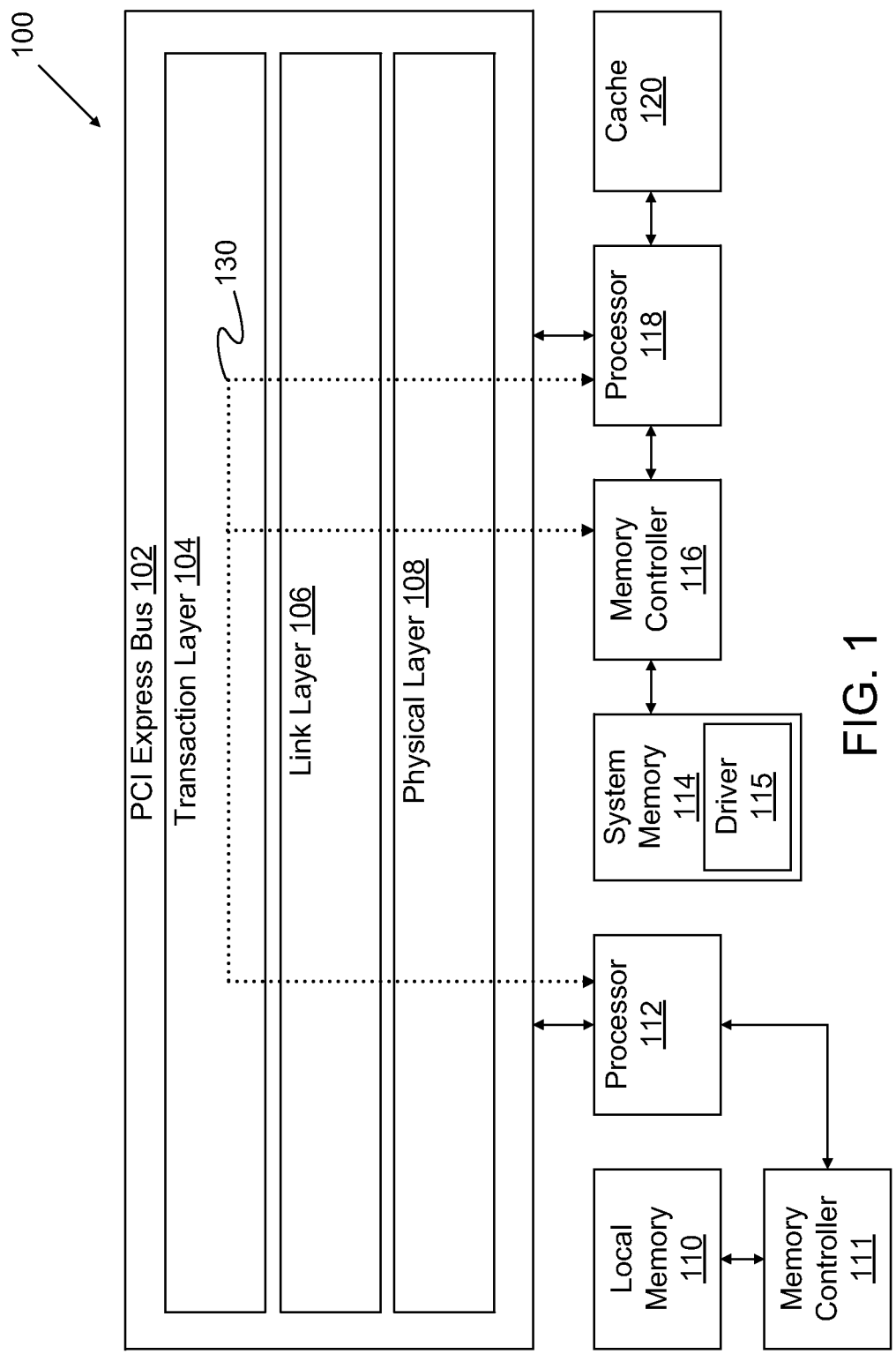
FIG. 1 is a block diagram of a computer system configured to implement one or more aspects of the present invention.

FIG. 1 is a block diagram of a computer system 100 configured to implement one or more aspects of the invention. As shown, the computer system 100 includes a Peripheral Component Interconnect Express (PCIe) bus 102, a local memory 110, a memory controller 111, a processor 112, a system memory 114, a memory controller 116, a processor 118, and a cache 120. The PCIe bus 102 includes a transaction layer 104, a link layer 106, and a physical layer 108. The PCIe bus 102 interconnects the processor 112 and the processor 118 and provides a communications path between these components.

The processor 112 and the processor 118 may be central processing units (CPUs), graphics processing units (GPUs), parallel processing units (PPUs), application-specific integrated circuits (ASICs), or other types of processing units.

The processor 112 and the processor 118 may be the same type of processing unit or may be processing units of different types. For example, the processor 112 could be a GPU that executes graphics processing operations, while the processor 118 could be a CPU that executes an operating system (OS) stored in the system memory 114.

The processor 118 is coupled to the memory controller 116 and may read data from the system memory 114 via the memory controller 116. In one embodiment, the processor 112 and/or the processor 118 are/is coupled to the memory controller 116 via the transaction layer 104 of the PCIe bus 102. The processor 112 and/or the processor 118 may thus access the system memory 114 through the PCIe bus 102. The processor 112 and the processor 118 may read data from the system memory 114, including program instructions and/or data required to execute the program instructions. For example, when the processor 112 is a GPU, the processor 112 may read program instructions that configure components of a graphics processing pipeline included within the processor 112 to execute specific graphics processing operations. The processor 112 may also read graphics data from the system memory 114 and/or local memory 110 and process the graphics data using the graphics processing pipeline.

The system memory 114 includes a software driver 115 implemented as a set of program instructions configured to coordinate operation of the processors 112, 118. For example, the program instructions that constitute the driver 115 may be executed by the processor 118 to implement the functionality of the driver 115, detailed below.

The processor 112 is coupled to the local memory 110 via the memory controller 111 and thus controls the operation of the local memory 110. When the processor 112 receives data from the PCIe bus 102, the processor 112 may store the received data in the local memory 110 for later use. The local memory 110 may be a low-latency memory unit configured to accelerate the execution of program instructions carried out by the processor 112. The local memory 110 may also store program instructions and/or drivers that, when executed by processor 112, implement the various functionalities of the computer system 100.

The processor 118 is coupled directly to the cache 120 and controls the operation of the cache 120. When the processor 118 receives data from the system memory 114 or from the PCIe bus 102, the processor 118 may store a temporary copy of the received data in the cache 120 for later use. The cache 120 is a low-latency memory unit, such as a static random-access memory (SRAM) module. Read requests made to the cache 120 have a lower latency than read requests made to the system memory 114. Accordingly, the cache 120 may accelerate the execution of program instructions carried out by the processor 118 because high-latency reads to the system memory 114 are avoided when the required data can be retrieved from the cache 120.

A "snoop" (SNP) transaction allows the processor 112 to check the state of the original data stored in the cache 120. The SNP transaction is implemented through the use of different messages transferred between the processor 112 and the processor 118 through the transaction layer 104 of the PCIe bus 102. These messages include a SNP request and a "complete" CPL message. The processor 112 transmits a SNP request along the snooping path 130 to initiate a SNP transaction. The SNP request includes the address of the cached data. In response to the SNP request, the processor 118 examines the data stored in the cache 120 and performs specific tasks that are dependent on the state of the data, as described in greater detail below in conjunction with FIGS. 2A-2B and FIGS. 3A-3C. When the processor 118 has completed these tasks, the processor 118 may transmit a CPL message that indicates that the SNP transaction is complete.

The PCIe bus 102 includes a root complex (not shown). The root complex is a controller that manages transactions between endpoints that are attached to the PCIe bus 102, such as the processor 112 and the processor 118. Accordingly, the root complex may be configured to route messages associated with the SNP transaction. In one embodiment, the root complex broadcasts SNP requests received from an endpoint to all other endpoints, or peers of the endpoint, that are above the root complex and not on the PCIe 102.

Figure 2A:
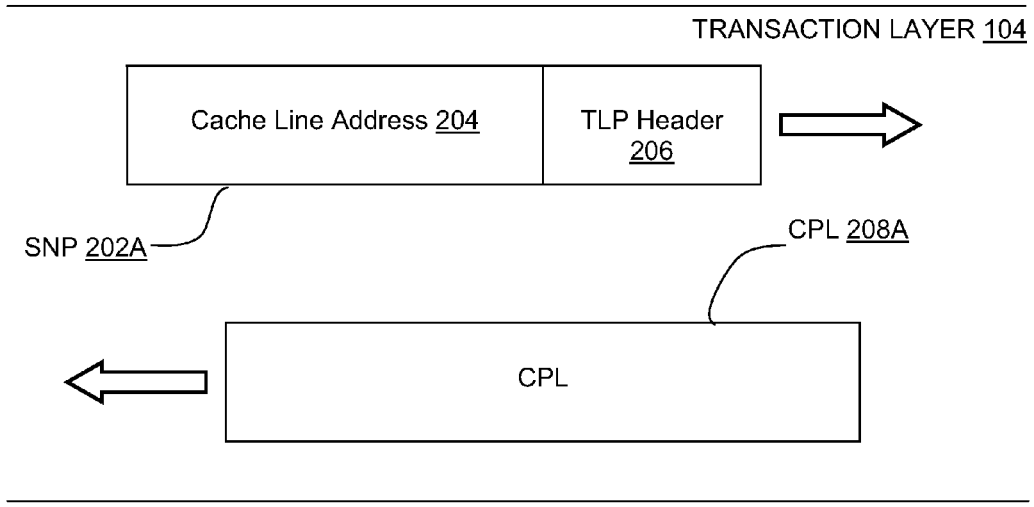
FIG. 2A-2B are conceptual diagrams illustrating first and second embodiments of packets associated with a "snoop" (SNP) transaction.

FIG. 2A is a conceptual diagram illustrating packets associated with a SNP transaction, according to a first embodiment of the invention. As shown, FIG. 2A illustrates a SNP request 202A and a CPL message 208A travelling through the transaction layer 104. In one embodiment, the SNP request 202A and the CPL message 208A do not travel through the transaction layer simultaneously, as described in greater detail herein. The SNP request 202A includes a cache line address 204 and a transaction layer packet (TLP) header 206. The cache line address 204 specifies the address of the cache line to be examined. The TLP header 206 identifies the message as a SNP request 202A to the recipient of the message.

The SNP request 202A may be added to the PCIe standard protocol as a "non-posted transaction." When a first PCIe endpoint transmits a non-posted transaction to a second PCIe endpoint, the first PCIe endpoint expects a CPL message in response. Thus, when the processor 112 transmits the SNP request 202A to the processor 118, the processor 112 expects the CPL message 208A from the processor 118 in response. Accordingly, the processor 118 transmits the CPL message 208A to the processor 112 when the SNP transaction is complete.

The processor 112 may generate and transmit a SNP request 202A to the processor 118 in order to determine whether the data stored in the local memory 110 is coherent with the data stored in the cache 120. When the processor 112 generates the SNP request 202A, the processor 112 includes the address of the cache line in the cache 120 where the data is stored as the cache line address 204. The message also includes the TLP header 206 that identifies the message as a SNP request 202A to the processor 118. When the processor 118 receives the SNP request 202A, the processor 118 parses the SNP request 202A and extracts the cache line address 204. The processor 118 then examines the tag associated with the specified cache line in the cache 120 and performs a sequence of operations, described in greater detail below in conjunction with FIGS. 3A-3C. Because the SNP request 202A is a non-posted write, the processor 112 expects the CPL message 208A to be returned by the processor 118 in response to the SNP request 202A. Accordingly, the processor 118 is configured to transmit the CPL 208A in response to the SNP request 202A.

Figure 2B:
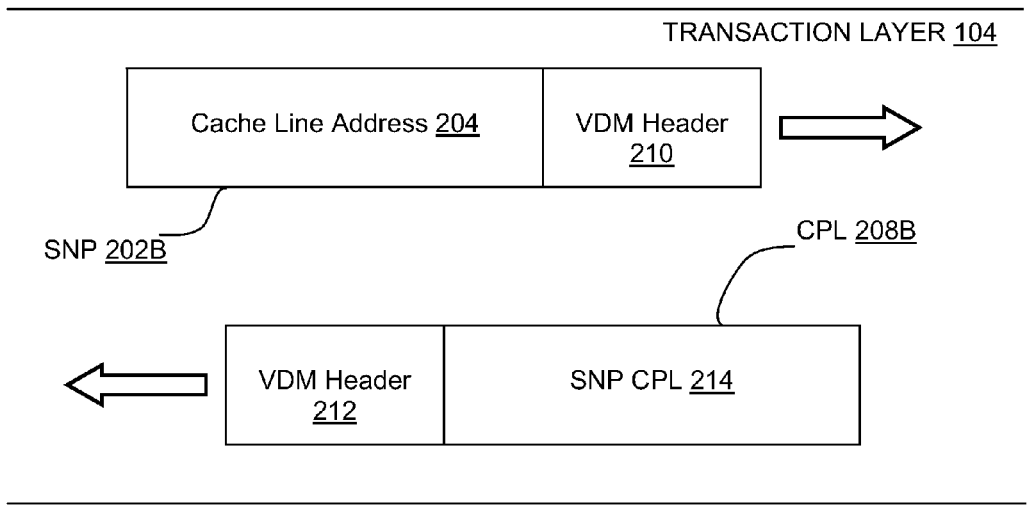

FIG. 2B is a conceptual diagram illustrating packets associated with a SNP transaction, according to a second embodiment of the invention. As shown, FIG. 2B illustrates a SNP request 202B and a CPL message 208B travelling through the transaction layer 104. In one embodiment, the SNP request 202B and the CPL message 208B do not travel through the transaction layer 104 simultaneously. SNP request 202B includes a cache line address 204 and a vendor-defined message (VDM) header 210. The CPL message 208B includes a VDM header 210 and a SNP CPL 214. The SNP request 202B and the CPL message 208B are both VDMs and are not included in the PCIe standard protocol. The processor 112 uses the SNP request 202A and the SNP request 202B in a similar fashion to initiate a SNP transaction. The processor 118 uses the CPL message 208A and the CPL message 208B in a similar fashion to indicate that the SNP transaction is complete.

When the processor 112 transmits the SNP request 202B to the processor 118, the processor 118 may return the CPL message 208B to the processor 112, depending on the state of the original data stored in the cache 120. When the processor 112 receives the CPL message 208B, the processor 112 parses the CPL message 208B and extracts the SNP CPL 214 to determine if the cached data is valid. The processor 112 may then read the required data stored in the local memory 110 if the data is determined to be valid.

Figure 3A:
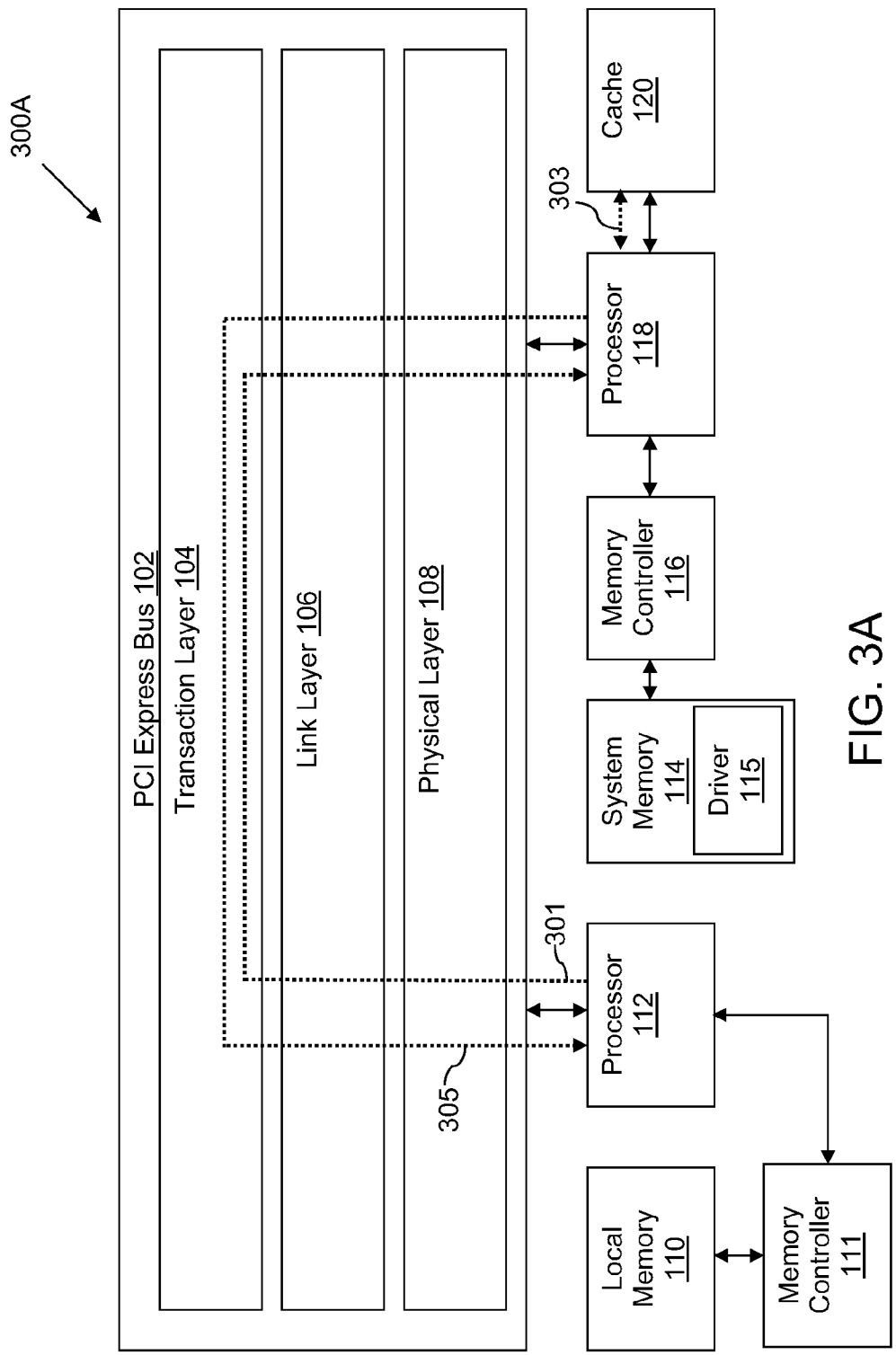
FIG. 3A-3C illustrate a first, second, and third SNP transaction, respectively, according to one embodiment of the invention.
Figure 3B:
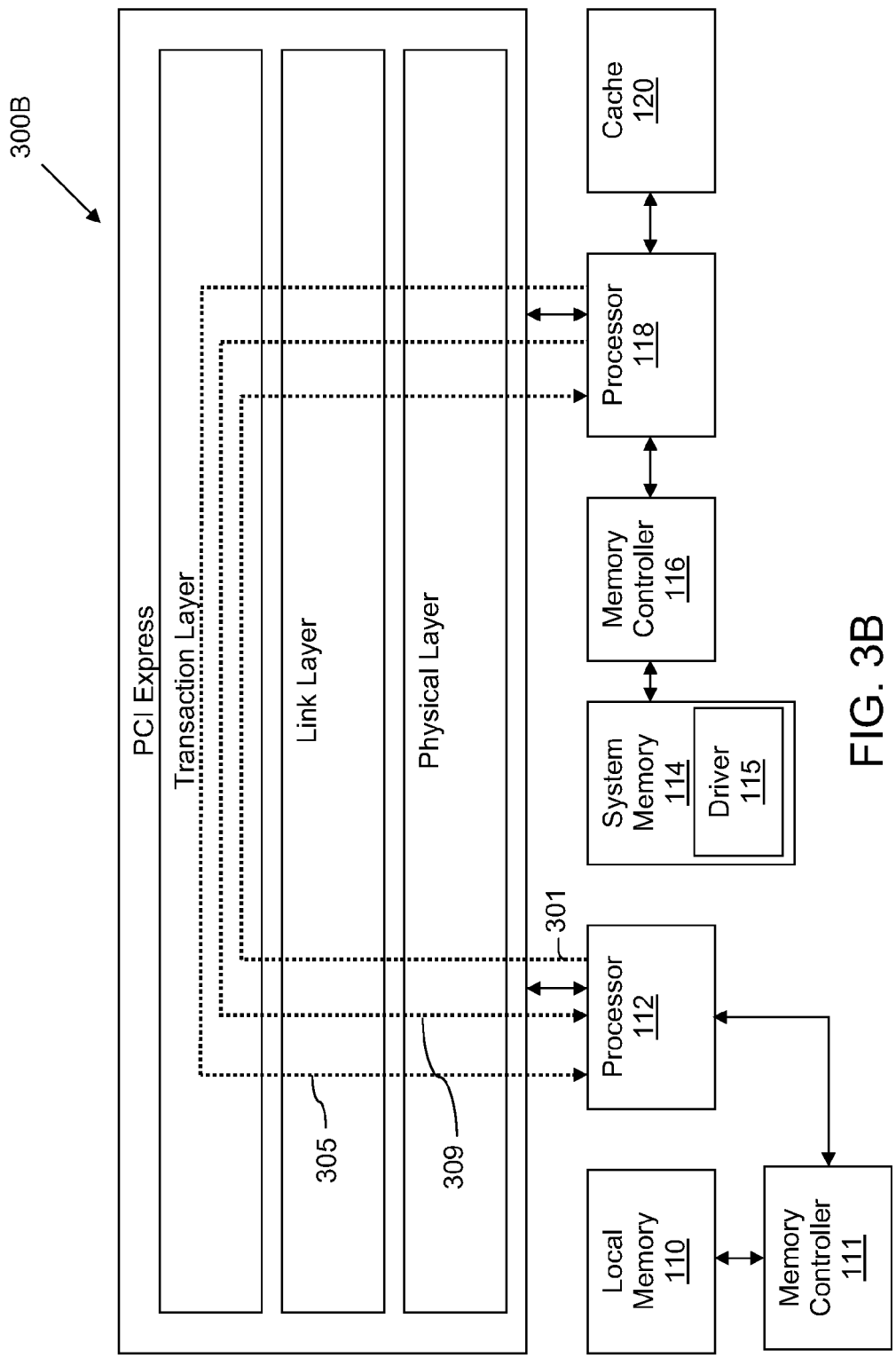
Figure 3C:
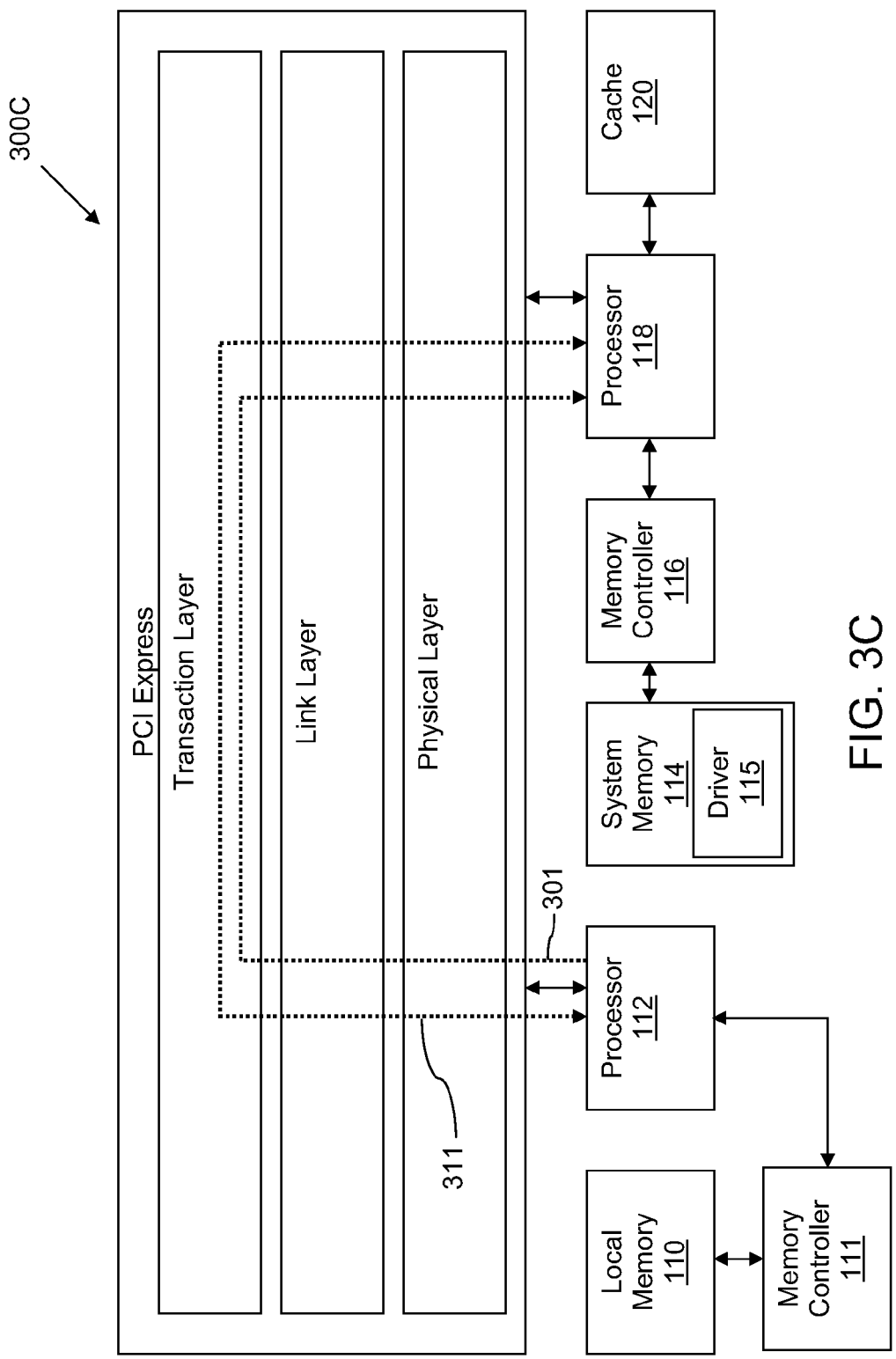

FIGS. 3A, 3B and 3C illustrate a computer system configured to implement a first, second, and third SNP transactions, respectively, according to one embodiment of the invention. Each of the first, second, and third SNP transactions may occur when instructions (e.g., the driver), executed by the processor 112, cause the processor 112 to generate a SNP request as part of executing those instructions in order to get the correct results. In response, the processor 118 examines data stored within the cache line addressed in the SNP request, and the processor 118 causes a CPL message to be returned. The first SNP transaction, as shown in FIG. 3A, occurs when the cache line is marked "exclusive" or "shared." The second SNP transaction, as shown in FIG. 3B, occurs when the cache line is marked "modified." The third SNP transaction, as shown in FIG. 3C, occurs when the cache line is marked "invalid." As used herein, a cache line is considered "valid" when the cache line is present in the cache in any state. The cache states typically implemented are "invalid," meaning that the cache line is not present in the cache, "exclusive," meaning that the cache line is present in the cache and has the same value as the copy in system memory 114 and no other cache has a copy, "shared," meaning that the cache line is present in the cache, has the same value as the copy in system memory 114, and another cache may also have a copy, and "modified," meaning that the cache line is present and has a value different than that in system memory 114.

Each SNP transaction is initiated when the processor 112 transmits a SNP request to the processor 118. In one embodiment, the SNP request is the SNP request 202A. In an alternative embodiment, the SNP request is the SNP request 202B.

FIG. 3A illustrates a computer system 300A configured to implement the first SNP transaction, according to one embodiment of the invention. As shown, the computer system 300A includes the same components illustrated in FIG. 1. In addition, sequential processing legs are demarcated that indicate the processing steps that occur when the cache line in cache 120 is marked "exclusive" or "shared." The first SNP transaction may be initiated when the processor 112 transmits a SNP request to the processor 118 along leg 301. The processor 118 receives the SNP request and parses the SNP request. The processor 118 extracts the cache line address 204 (not shown here) from the SNP request. The processor 118 accesses the specified cache line in the cache 120 along leg 303 and examines the tag associated with the specified cache line.

If the data is marked "exclusive" or "shared," then the processor 118 causes the transmission of a CPL message to the processor 112 along leg 305. In addition, the state of the cache line is changed to "invalid," (i.e. the cache line is removed from the cache). Removing the cache line ensures that the processor 118 does not use a "stale" copy of the cache line from cache 120 after the processor 112 has modified the cache line. The CPL message indicates to processor 112 that the SNP transaction has completed, and the data stored in local memory 110 is the correct version. The processor 112 may, therefore, use the data stored in the local memory 110 to perform processing operations. When the processor 112 receives the CPL message, the processor 112 then reads the data from the local memory 110.

FIG. 3B illustrates a computer system 300B configured to implement the second SNP transaction, according to one embodiment of the invention. As shown, the computer system 300B includes the same components illustrated in FIG. 1. In addition, sequential processing legs are demarcated that indicate the processing steps that occur when the cache line in cache 120 is marked "modified." The second SNP transaction includes some steps that are substantially similar to those described in conjunction with FIG. 3A. The second SNP transaction proceeds in a different fashion, however, when examination of the specified cache line determines that the data is marked "modified."

If the data is marked "modified," then the processor 118 transmits the data stored at the specified cache line of the cache 120 to the processor 112 along leg 309. The processor 112 then writes the received data to the local memory 110 by writing over the corresponding copy of the data stored in the local memory 110, thus updating the local memory 110 to reflect the most recent version of the data. When the processor 112 has finished writing the data, the processor 118 receives a write completion (not shown) from the processor 112. In one embodiment, the write completion is a CPL message that indicates that data was successfully written to the local memory 110. The processor 118 then transmits a CPL message to the processor 112 along leg 305. The CPL message indicates to processor 112 that the SNP transaction has completed and that the data stored in the local memory 110 is correct. The processor 112 may, therefore, use the data stored in the local memory 110 to perform processing operations. When the processor 112 receives the CPL message, the processor 112 may read the data from the local memory 110.

FIG. 3C illustrates a computer system 300C configured to implement the third SNP transaction, according to one embodiment of the invention. As shown, the computer system 300C includes the same components illustrated in FIG. 1. In addition, sequential processing legs are demarcated that indicate the processing steps that occur when the cache line in cache 120 is marked "invalid." The third SNP transaction includes some steps that are substantially similar to those described in conjunction with FIGS. 3A and 3B. The third SNP transaction proceeds in a different fashion, however, when examination of the specified cache line determines that the data is marked "invalid."

The third SNP transaction may be initiated when the processor 112 transmits a SNP request to the processor 118 along leg 301. The processor 118 examines the specified cache line and determines that the data is marked invalid. The processor 118 then causes the CPL message to be transmitted to the processor 112 along leg 311, indicating that the data stored in the local memory 110 is the most recently stored and/or modified version of the data.

Additionally, the processor 112 requires data that is stored in the local memory 110 and, thus, issues a SNP request to the processor 118, while, coincidentally, processor 118 issues a read request targeting that same data in local memory 110. The read request issued by the processor 118 is received by the processor 112 after the processor 112 has issued the SNP request, but prior to the SNP request arriving at the processor 118. In such a case, using conventional systems, the processor 112 waits for the CPL message to be returned in response to the SNP request, but the processor 118 does not issue the CPL message until the read request is completed. That is, in these conventional systems, the processor 112 waits for the CPL message before servicing the read request, while the processor 118 waits for the read request data before issuing the CPL message. This problematic situation is known as "deadlock."

Another problematic situation may occur when using conventional systems since standard PCIe ordering rules allow read requests to pass CPL messages. If the processor 118 issues the CPL message before issuing the read request, then the read request may arrive at the processor 112 before the CPL message. The processor 118 will again have a copy of the data from local memory 110 in cache 120 when the processor 112 returns the data for the read request. The processor 112 would then need to issue another SNP request and the cycle could repeat itself, possibly indefinitely. This situation is known as "livelock."

Embodiments of the invention avoid possible deadlock and livelock issues by taking note that if the processor 118 had a copy of the data in the cache 120, then the read request would have been serviced by the cache 120 and the read request would never have been sent to the processor 112. As a result, if the processor 112 receives a read request for a memory location having an outstanding SNP request (i.e., no CPL message has been received in response to the SNP request), then the processor 112 responds as if the processor 118 indicated that a copy of the data was not found in the cache 120, regardless of the order the transactions issued at the processor 118 (e.g., read request then SNP request, or SNP request then read request). Thus, the processor 112 can safely use and/or modify the local memory location and then return this data to service the read request. Accordingly, the processor 112 has made "forward progress" and does not need to reissue the SNP request for the currently-referenced data (i.e., avoiding possible livelock) and the processor 112 can return the data associated with the read request prior to receiving the CPL message associated with the SNP request (i.e., avoiding possible deadlock). A CPL message for the SNP request is still returned by the processor 118, but in one embodiment, the processor 112 disregards the CPL message since the processor 112 has already determined that the data stored in the local memory 110 is correct based on receipt of the read request from the processor 118.

Figure 4:
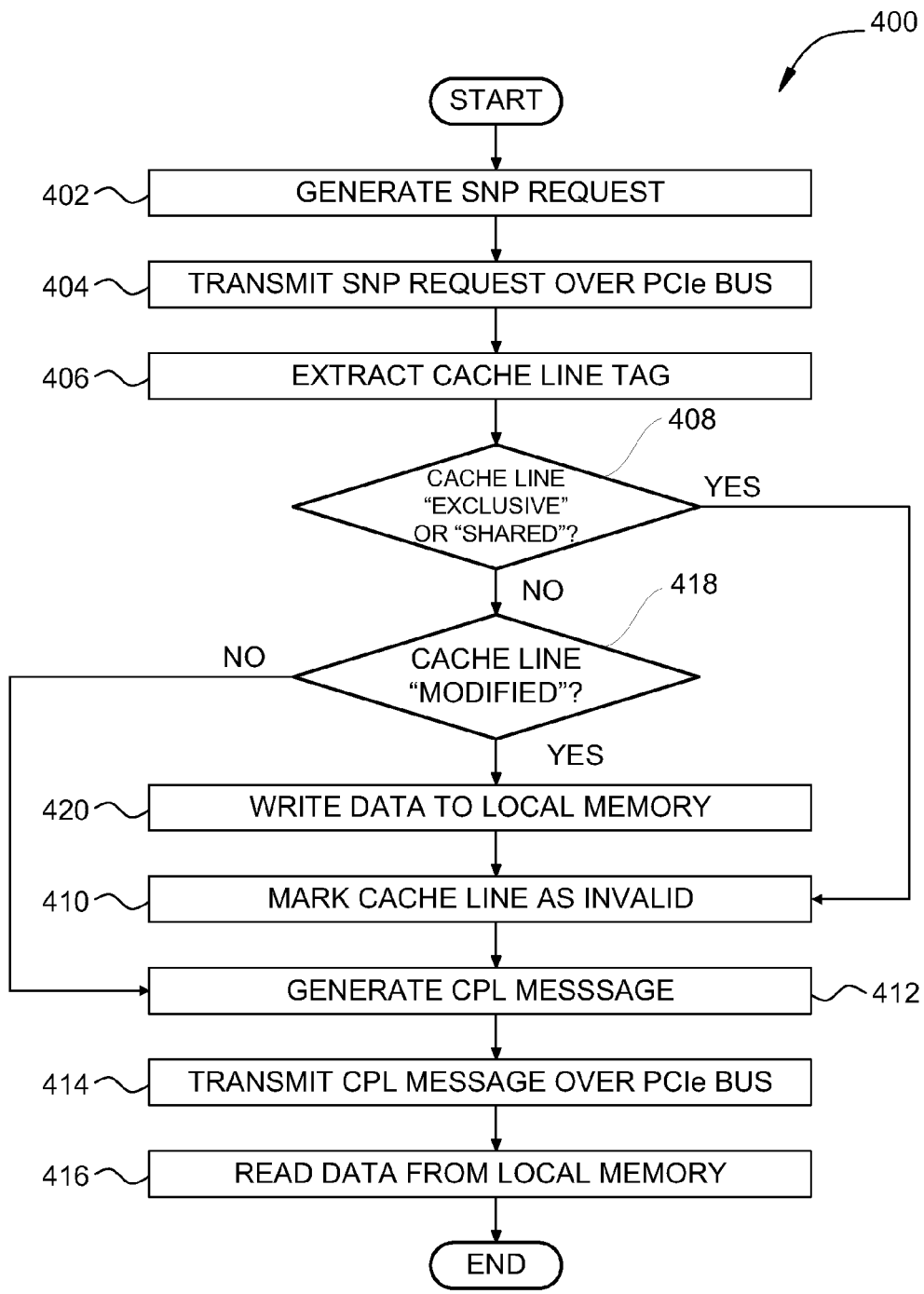
FIG. 4 is a flowchart of method steps for implementing a SNP transaction over a PCIe bus, according to one embodiment of the invention.

FIG. 4 is a flowchart of method steps for implementing SNP transactions on a PCIe bus, according to one embodiment of the invention. Persons of ordinary skill in the art should understand that, even though the method 400 is described in conjunction with the systems of FIGS. 1 and 3A-3C, any system configured to perform the method steps, in any order, is within the scope of the invention.

As shown, the method 400 begins at step 402, where the processor 112 generates a SNP request. In one embodiment, the driver executed by the processor 112 instructs the processor 112 to use data, which, in turn, causes the processor 112 to generate the SNP request to ensure coherency. For example, the processor 112 may be attempting to use data stored in the local memory 110 to perform processing operations, where a cached copy of the data is stored in the cache 120 associated with the processor 118. The SNP request is issued to initiate a SNP transaction that allows the processor 112 to maintain coherency between the local memory 110 and the cache 120. When the processor 112 generates the SNP request, the processor 112 includes an address that indicates the cache line in the cache where the required data is stored, as described in greater detail below in conjunction with FIG. 5. The SNP request may be the SNP request 202A or the SNP request 202B, described in FIGS. 2A and 2B, respectively.

At step 404, the processor 112 causes the transmission of the SNP request to the processor 118 over the PCIe bus 102. The SNP request travels through the transaction layer 104 of the PCIe bus 102. The processor 118 receives the SNP request and, at step 406, extracts the cache line address 204 from the SNP request. The processor 118 examines a cache line identified by the cache line address 204 and extracts a tag associated with the cache line. The tag indicates the state of the data stored at the cache line.

At step 408, the processor 118 determines whether the cache line is marked either "exclusive" or "shared." If the cache line is marked "exclusive" or "shared," then no action is necessary to establish cache coherency between the cache 120 and the local memory 110 because the data stored in the cache 120 is identical to the data stored in the local memory 110. The method 400 proceeds to step 410, where the processor 118 marks the cache line as "invalid." Thus, the state of the cache line is changed to "invalid," (i.e. the cache line is removed from the cache). Removing the cache line ensures that the processor 118 does not use a stale copy of the cache line from cache 120 after the processor 112 has modified the cache line.

The method 400 then proceeds to step 412, where the processor 118 generates the CPL message. The CPL message may be the CPL message 208A or may be the CPL message 208B, as described in conjunction with FIGS. 2A and 2B, respectively.

At step 414, the processor 118 transmits the CPL message to the processor 112 to indicate that the data stored in the local memory 110 is coherent with the original data stored in the cache 120 and/or correct. At step 416, the processor 112 reads the data from the local memory 110 and the method terminates.

Referring back to step 408, if the processor 118 determines that the cache line is not marked either "exclusive" or "shared," then the method proceeds to step 418, where the processor 118 determines whether the cache line is marked "modified." The cache line may be marked modified when the processor 118 has performed processing operations that have changed the value of the data stored in the cache 120 relative to the data stored in the local memory 110. If the processor 118 determines, at step 418, that the cache line is marked "modified," then the method proceeds to step 420, where the processor 112 writes the modified data to the local memory 110. The method then proceeds to step 410, which is previously described herein.

If, at step 418, the cache line is not marked "modified," then the method 400 proceeds to step 412, which is previously described herein. If the cache line is not "exclusive" or "shared" (determined in step 408) and the cache line is not "modified" (determined in step 418), then the cache line is "invalid" and the processor 118 generates the CPL message (step 412) because no action is necessary to establish cache coherency between the cache 120 and the local memory 110.

Additionally, as described in conjunction with FIG. 3C, the processor 118 may issue a read request for a memory location in local memory 110 corresponding to the memory location associated with SNP request. In such a scenario, the processor 112 receives the read request, disregards the CPL message received from the processor 118 in response to the SNP request, performs operations using the data stored in local memory (which possibly modifies the data), and then services the read request to the processor 118. Accordingly, the processor 112 has made "forward progress" and does not need to reissue the SNP request for the current reference (i.e., avoiding possible livelock) and the processor 112 can return the data for the read request, possibly prior to receiving the CPL message for the SNP request (i.e., avoiding possible deadlock). A CPL message for the SNP request is still returned by the processor 118, but in one embodiment, the processor 112 disregards the CPL message since the processor 112 has already determined that the data stored in the local memory 110 is correct based on receipt of the read request from the processor 118.

Figure 5:
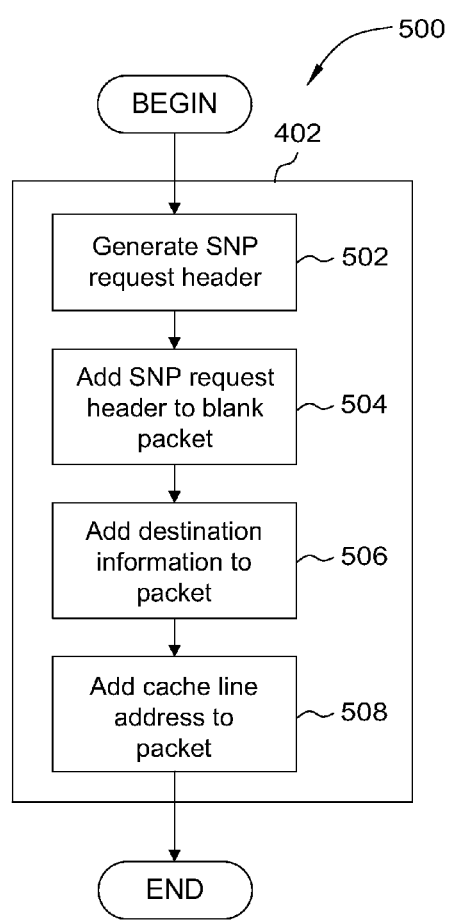
FIG. 5 is a flowchart of method steps for generating a SNP request for transmission over a PCIe bus, according to one embodiment of the invention.

FIG. 5 is a flowchart of method steps for generating a SNP request for transmission over a PCIe bus, according to one embodiment of the invention. Persons skilled in the art will understand that, even though the method 500 is described in conjunction with the systems and method of FIGS. 1, 3A-3C and 4, any system configured to perform the method steps, in any order, is within the scope of the invention.

As shown, the method 500 begins at step 502, where the processor 112 generates a SNP request header. At step 504, the processor 112 adds the SNP request header to a blank packet. In one embodiment, the SNP request is the SNP request 202A, and the SNP request header is the TLP header 206, as shown in FIG. 2A. The TLP header 206 identifies the message as a SNP request 202A to the processor 118. In an alternative embodiment, the SNP request is the SNP request 202B, and the SNP request header is the VDM header 210, as shown in FIG. 2B. The VDM header 210 identifies the message as a SNP request 202B to the processor 118.

At step 506, the processor 112 adds the destination information to the packet. The destination information identifies the processor 118 as the intended recipient of the SNP request. The PCIe bus includes logic that routes the SNP request to the processor 118 according to the destination information. At step 508, the processor 112 adds the cache line address of the cache 120 to be "snooped" to the SNP request. The cache line address indicates the location of the original data in the cache 120.

Figure 6:
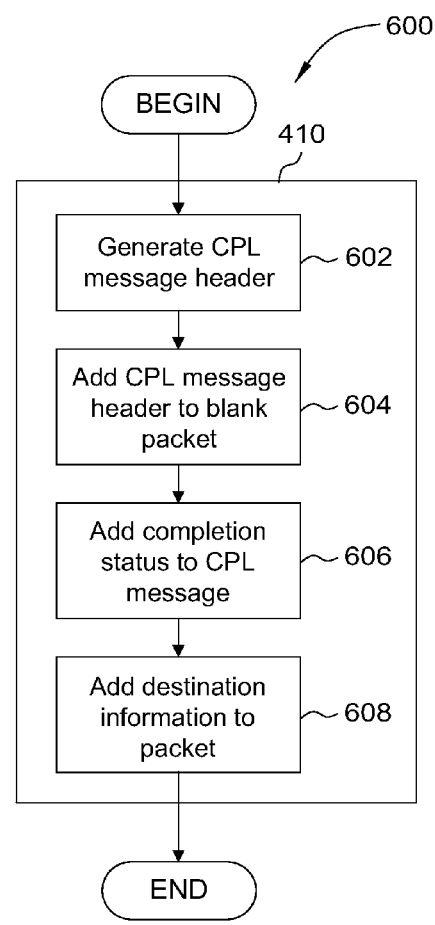
FIG. 6 is a flowchart of method steps for generating a CPL message for transmission over a PCIe bus, according to one embodiment of the invention.

FIG. 6 is a flowchart of method steps for generating a CPL message for transmission over a PCIe bus, according to one embodiment of the invention. Persons skilled in the art will understand that, even though the method 600 is described in conjunction with the systems and method of FIGS. 1, 3A-3C and 4, any system configured to perform the method steps, in any order, is within the scope of the invention.

As shown, the method 600 begins at step 602, where the processor 118 generates a CPL message header. The processor 118 may have received a SNP request and may have performed the actions described above in conjunction with FIGS. 3A-3C to update either the local memory 110 or the cache 120. Once these actions are complete, and the local memory 110 stores the most recent version of the data, then the processor 118 will generate a CPL message that, when received by the processor 112, completes the SNP transaction.

At step 604, the processor 118 adds the CPL message header to a blank packet. In one embodiment, the CPL message is the CPL message 208A, as shown in FIG. 2A. In an alternative embodiment, the CPL message is the CPL message 208B and the CPL message header is the VDM header 212, as shown in FIG. 2B. The VDM header 212 identifies the CPL message 208B to the processor 112.

At step 606, the processor 118 adds a completion status to the CPL message. In one embodiment, the completion status is a read completion notification. In an alternative embodiment, the completion status indicates that no action was taken. In yet a third embodiment, the completion status is blank. At step 608, the processor 118 adds destination information to the packet. The destination information identifies the processor 112 as the intended recipient of the CPL message. The PCIe bus includes logic that routes the CPL message to the processor 112 according to the destination information. When the processor 112 receives the CPL message, the SNP transaction is complete, and the local memory 110 is coherent with the cache 120.

In sum, embodiments of the invention provide a technique to perform a "snoop" (SNP) transaction on a PCIe bus. A SNP transaction is implemented using a SNP request and a "complete" CPL message. When a first processor stores data in a local memory unit that was received via the PCIe bus, the first processor checks the source of the data using the SNP request to determine if the data is coherent and, if not, obtains an updated version. When the source of the original data is a cache associated with a second processor, the first processor generates a SNP request that includes a cache line address into the cache. The cache line address indicates the cache line of the cache where the original data is stored. The first processor causes the transmission of the SNP request to the second processor. When the second processor receives the SNP request, the second processor parses the cache line address and retrieves the tag associated with that cache line.

When the tag indicates that the cache line is "exclusive" or "shared," the second processor causes the transmission of a "complete" (CPL) message to the first processor over the PCIe bus. The CPL message informs the first processor that the data stored in the local memory unit is valid and may be used when performing processing operations. The first processor may then retrieve the data from the local memory unit.

When the tag indicates that the cache line is "modified," the second processor retrieves the modified data from the cache and writes the data to the local memory unit. The second processor transmits a CPL message to the first processor, and the first processor may then retrieve the required data from the local memory.

When the tag indicates that the cache line is "invalid," the second processor issues the CPL message, informing the first processor that the first processor may safely retrieve the required data from the local memory unit.

Further embodiments of the invention provide a technique for avoiding possible deadlock and livelock situations by having the first processor disregard the CPL message received in response to a SNP request when an intervening read request is received from the second processor to access the same memory location.

Additionally, the SNP request may be defined into the PCIe standard protocol as a transaction layer packet (TLP) or as a vendor-defined message (VDM). When the SNP request is defined as a TLP, the SNP request includes a TLP header and the address of the cache line to be examined. A CPL message is then transmitted indicating that the SNP transaction is complete. When the SNP request is defined as a VDM, the SNP request includes a VDM header and the address of the cache line to be examined. A second VDM is also defined that includes a "complete" notification within the data payload. The second VDM is transmitted once the SNP transaction is complete.

Advantageously, a first processor may store data in a local memory unit when that data is received via the PCIe bus and is cached by a second processor. The first processor uses the SNP request to ensure that the data is coherent with the data cached by the second processor. A further advantage is that data transmitted across the PCIe bus may be marked as "cacheable," removing the need for processors that receive this data to serialize the execution of program instructions. Processor speed may thus be significantly improved when performing operations with data received over the PCIe bus.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as Compact Disc Read-Only Memory (CD-ROM) disks readable by a CD-ROM drive, flash memory, Read-Only Memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for maintaining cache coherency over a bus, the method comprising:
   receiving a first request to access data from a first location in a first memory associated with a first processor;
   generating a snoop (SNP) request from the first processor directed to a second processor associated with a second memory;
   causing the SNP request to be transmitted to the second processor via the bus;
   causing the second processor to generate a complete (CPL) message, wherein the CPL message indicates that the first location in the first memory is coherent with a corresponding second location in the second memory;
   receiving the CPL message at the first processor directly from the second processor via the bus; and
   reading first data corresponding to the first location in the first memory.

2. The method of claim 1, further comprising, causing the second processor to perform the steps of:
   determining that a cache line associated with the second memory is marked as exclusive to the second processor; and
   marking the cache line as invalid.

3. The method of claim 1, further comprising, causing the second processor to perform the steps of:
   determining that a cache line associated with the second memory is marked as shared between the first memory and the second memory; and
   marking the cache line as invalid.

4. The method of claim 1, further comprising, causing the second processor to perform the steps of:
   determining that a cache line associated with the second memory is marked as modified by the second processor;
   retrieving second data corresponding to the second location in the second memory;
   writing the second data to the first location in the first memory; and
   marking the cache line as invalid.

5. The method of claim 1, wherein generating the SNP request comprises:
   generating a SNP request header;
   adding the SNP request header to a packet;

adding destination information associated with the second processor to the packet; and adding a cache line address associated with the second location to the packet.

6. The method of claim 1, wherein causing the second processor to generate a CPL message comprises, causing the second processor to perform the steps of:

generating a CPL message header;
adding the CPL message header to a packet;
adding completion status to the packet; and
adding destination information associated with a sender of the SNP request to the packet.

7. The method of claim 1, wherein the bus is a peripheral component interconnect express (PCIe) bus.

8. The method of claim 1, further comprising:
receiving a second request to access data from the first location prior to receiving the CPL message;
completing the first request prior to receiving the CPL message; and
completing the second request prior to receiving the CPL message.

9. The method of claim 1, wherein the SNP request comprises a non-posted transaction, wherein the first processor expects to receive a message from the second processor in response to the SNP request.

10. The method of claim 1, wherein the SNP request comprises a vendor-defined message having a vendor-defined header that includes destination information that identifies the second memory.

11. The method of claim 1, wherein the CPL message comprises a vendor-defined message having a vendor-defined header that includes destination information that identifies the first memory.

12. A non-transitory computer-readable medium storing instructions that, when executed by a processor, cause the processor to maintain cache coherency over a bus, by performing the steps of:

receiving a first request to access data from a first location in a first memory associated with a first processor;
generating a snoop (SNP) request from the first processor directed to a second processor associated with a second memory;
causing the SNP request to be transmitted to the second processor via the bus;
causing the second processor to generate a complete (CPL) message, wherein the CPL message indicates that the first location in the first memory is coherent with a corresponding second location in the second memory;
receiving the CPL message at the first processor directly from the second processor via the bus; and
reading first data corresponding to the first location in the first memory.

13. The computer-readable medium of claim 12, further storing instructions for causing the second processor to perform the step of extracting a cache line tag associated with the second location.

14. The computer-readable medium of claim 12, further storing instructions for causing the second processor to perform the steps of:

determining that a cache line associated with the second memory is marked as exclusive to the second processor; and
marking the cache line as invalid.

15. The computer-readable medium of claim 12, further storing instructions for causing the second processor to perform the steps of:

determining that a cache line associated with the second memory is marked as shared between the first memory and the second memory; and
marking the cache line as invalid.

16. The computer-readable medium of claim 12, further storing instructions for causing the second processor to perform the steps of:

determining that a cache line associated with the second memory is marked as modified by the second processor;
retrieving second data corresponding to the second location in the second memory;
writing the second data to the first location in the first memory; and
marking the cache line as invalid.

17. The computer-readable medium of claim 12, wherein generating the SNP request comprises:

generating a SNP request header;
adding the SNP request header to a packet;
adding destination information associated with the second processor to the packet; and
adding a cache line address associated with the second location to the packet.

18. The computer-readable medium of claim 12, wherein causing the second processor to generate a CPL message comprises, causing the second processor to perform the steps of:

generating a CPL message header;
adding the CPL message header to a packet;
adding completion status to the packet; and
adding destination information associated with a sender of the SNP request to the packet.

19. The computer-readable medium of claim 12, wherein the bus is a peripheral component interconnect express (PCIe) bus.

20. A computer system, comprising:
a first processor;
a first memory associated with the first processor;
a second processor;
a second memory associated with second processor; and
a bus configured to route messages between the first processor and the second processor;
wherein the first processor is configured to maintain cache coherency over the bus, by performing the steps of:
receiving a first request to access data from a first location in a first memory associated with a first processor;
generating a snoop (SNP) request from the first processor directed to a second processor associated with a second memory;
causing the SNP request to be transmitted to the second processor via the bus;
causing the second processor to generate a complete (CPL) message, wherein the CPL message indicates that the first location in the first memory is coherent with a corresponding second location in the second memory;
receiving the CPL message at the first processor directly from the second processor via the bus; and
reading first data corresponding to the first location in the first memory.

* * * * *